United States Patent [19]
DeLeo et al.

[11] Patent Number: 6,042,327
[45] Date of Patent: Mar. 28, 2000

[54] ARM LEVER ADAPTOR FOR ADAPTING A HANDRAIL OF A WHEELCHAIR LIFT

[75] Inventors: Dante Vincent DeLeo; Stanton Saucier, both of Tarzana, Calif.

[73] Assignee: Ricon Corporation, Panorama City, Calif.

[21] Appl. No.: 09/078,146

[22] Filed: May 13, 1998

[51] Int. Cl.[7] ........................................ B60P 1/44
[52] U.S. Cl. ................ 414/540; 414/546; 414/917; 414/921
[58] Field of Search ........................ 414/540, 545, 414/546, 556, 557, 917, 921

[56] References Cited

U.S. PATENT DOCUMENTS

| | | | |
|---|---|---|---|
| 4,111,317 | 9/1978 | Robinson | 414/557 X |
| 4,140,230 | 2/1979 | Pearson | 414/921 X |
| 5,261,779 | 11/1993 | Goodrich | 414/546 |
| 5,373,915 | 12/1994 | Tremblay | 414/921 X |
| 5,401,135 | 3/1995 | Stoen et al. | 414/921 X |
| 5,433,581 | 7/1995 | Farsai | 414/556 X |
| 5,605,431 | 2/1997 | Saucier et al. | 414/546 |

*Primary Examiner*—Douglas Hess
*Attorney, Agent, or Firm*—Thomas I. Rozsa; Tony D. Chen; Jerry Fong

[57] ABSTRACT

An unity arm lever adaptor for use with a powered vehicular wheelchair lift. The unity arm lever adaptor is adapted for connecting together to a handrail, a vertical arm, a saddle or roller, and a vertical link of the wheelchair lift. The arm lever adaptor has an extended adaptor section, an elongated main section, and a pivotable yoke section. The main section has a pivotable end which is remote from the yoke section but adjacent to the extended adaptor section. The extended adaptor section is inserted through an opening on the vertical arm for adapting and securing to an end of the handrail. The pivotable end is pivotably connected to the vertical arm. The yoke section is pivotably connected to the saddle and the vertical link.

9 Claims, 3 Drawing Sheets

ARM LEVER ADAPTOR FOR ADAPTING A HANDRAIL OF A WHEELCHAIR LIFT

BACKGROUND OF THE INVENTION

1. Field of the Invention

The present invention generally relates to the field of vehicular wheelchair lifts for persons who are physically challenged or otherwise have limited mobility. More particularly, the present invention relates to the field of arm lever adaptors for adapting handrails of vehicular wheelchair lifts.

2. Description of the Prior Art

Vehicular wheelchair lifts are widely utilized to assist persons in wheelchair to enter and exit vehicles. The wheelchair lifts have arm levers which are pivotably connected to vertical arms and connected to handrails. These prior art arm levers are complicated because they require too many parts.

It is desirable to provide a very efficient and also very effective design and construction of an arm lever adaptor for adapting and connecting to handrails of a wheelchair lift. It is also desirable to provide an arm lever adaptor which eliminates the many parts which are required in prior art arm levers, and thereby significantly improves the connection between a handrail, a vertical arm, a saddle or roller, and a vertical link.

SUMMARY OF THE INVENTION

The present invention is an improved unity arm lever adaptor for use with a powered vehicular wheelchair lift. The arm lever adaptor is adapted for connecting together to a handrail, a vertical arm, a saddle or roller, and a vertical link of the wheelchair lift.

It is an object of the present invention to provide an improved unity arm lever adaptor for adapting a handrail, a vertical arm, a saddle or roller, and a vertical link of a wheelchair lift which significantly improves the connected therebetween.

It is a further object of the present invention to provide an improved unity arm lever adaptor which eliminates the many parts which are required in prior art arm levers, and therefore significantly reduces manufacturing costs Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DESCRIPTION OF THE PREFERRED EMBODIMENT

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Figure 1:
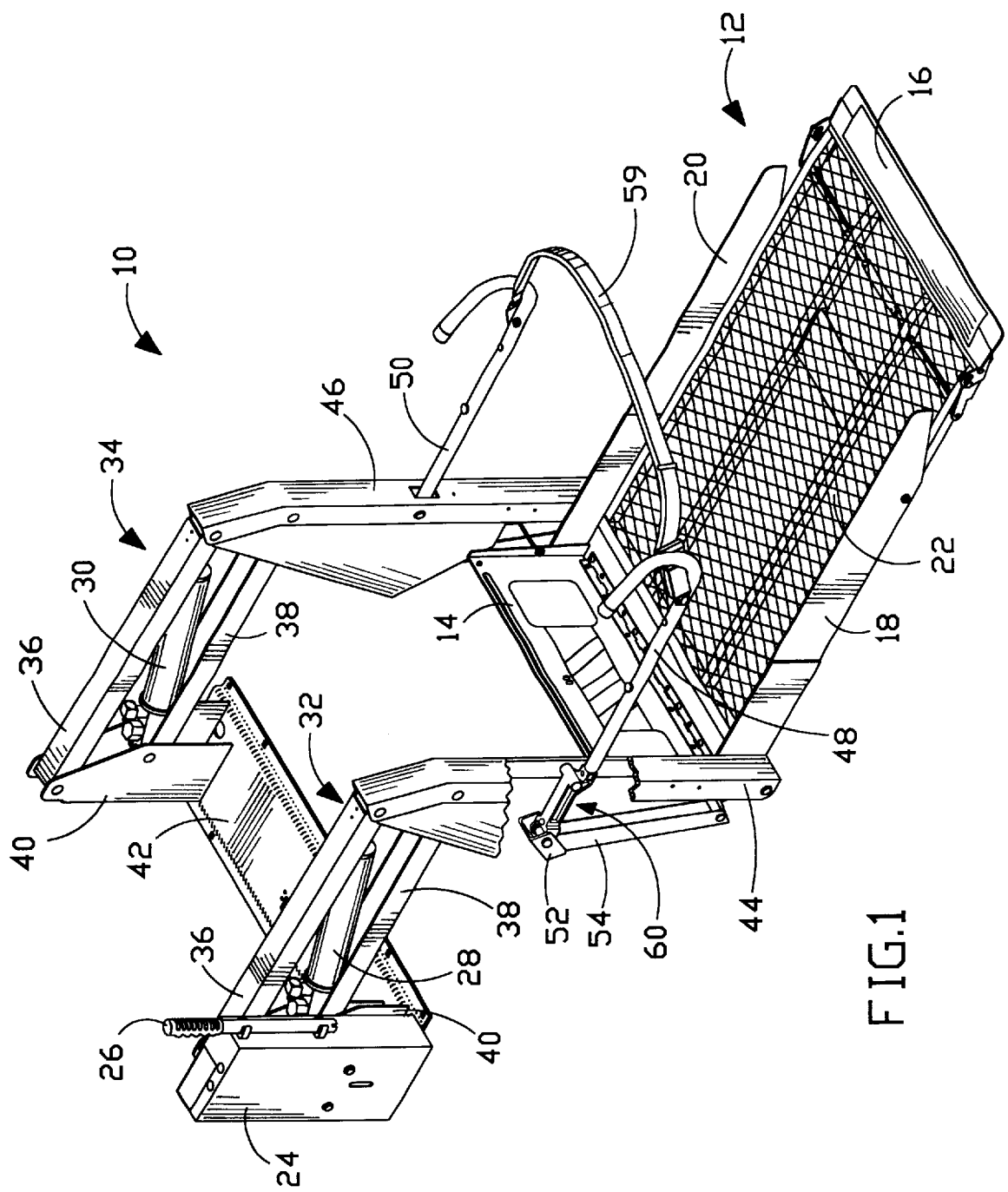
FIG. 1 is a perspective view of a conventional vehicular wheelchair lift with the present invention arm lever adaptor incorporated therein.

Referring to FIG. 1, there is shown at 60 the present invention improved unity arm lever adaptor which is utilized with a conventional powered vehicular wheelchair lift 10. The wheelchair lift 10 comprises a platform assembly 12 located in a ground level position with an inboard roll-stop 14 fully closed and an outer roll-stop 16 fully opened. Two opposite side panels 18 and 20 are relatively mounted on opposite sides of a platform 22 to prevent a wheelchair (not shown) from rolling off the sides of the platform 22. The platform assembly 12 can be lifted upwardly and downwardly among a stowed level position, an entry level position and the ground level position by a conventional actuating system such as an electric or hydraulic system. For example, in a hydraulic system, it may include a hydraulic power unit 24, a manual backup pump handle 26 connected to the hydraulic power unit 24, and a pair of opposite hydraulic cylinders 28 and 30 which are respectively mounted on a pair of opposite relative parallelogram linkage structures 32 and 34.

Figure 4:
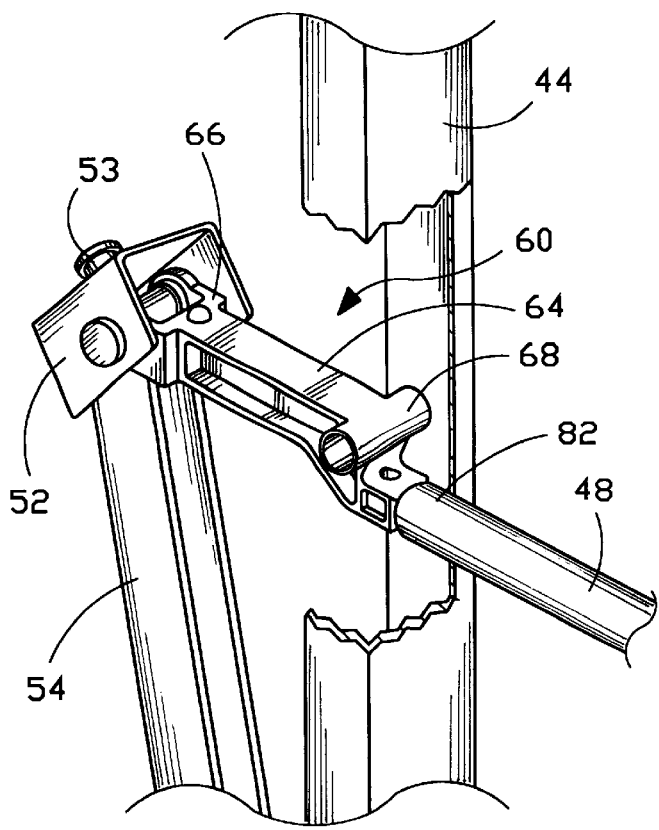
FIG. 4 is an enlarged front partial perspective view of the present invention unity arm lever adaptor with the vertical arm broke-away to better illustrate the structural relationship of the components.
Figure 5:
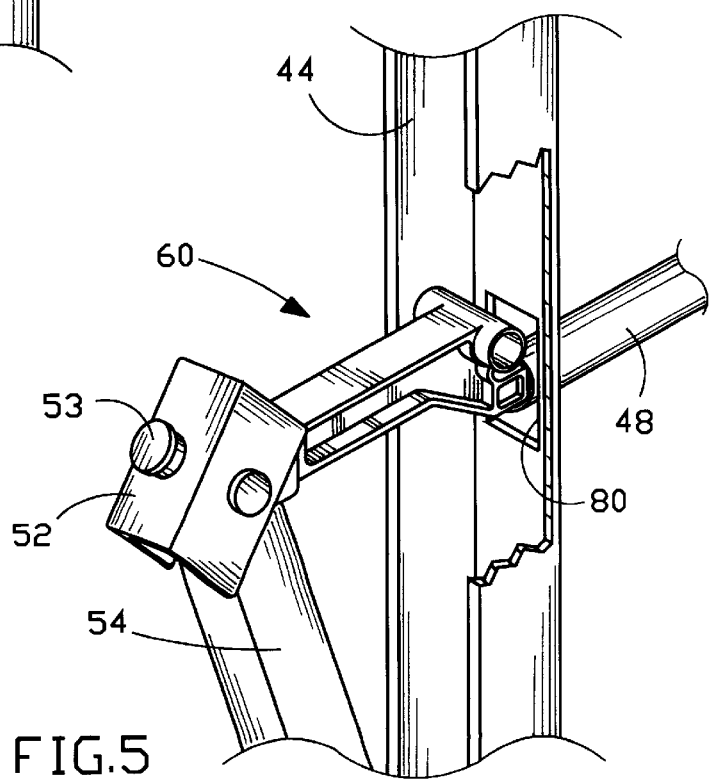
FIG. 5 is an enlarged rear partial perspective view of the present invention unity arm lever adaptor with the vertical arm broke-away to better illustrate the structural relationship of the components.

Each parallelogram linkage structure includes a top arm 36 and a bottom arm 38 which is parallel to the top arm 36. Each top and bottom arms 36 and 38 are pivotably connected at their rear ends to a mounting bracket 40 which is affixed to a mounting plate 42 by conventional means. The front ends of the top and bottom arms 36 and 38 are respectively and pivotably connected to a pair of opposite elongated vertical arms 44 and 46 which are pivotably connected to the platform 22. The wheelchair lift 10 further comprises a pair of opposite handrails 48 and 50 which are respectively adapted for connecting an engaging member 52 such as a saddle or a roller (not shown) and a vertical link 54 by the present invention unity arm lever adaptor 60. The saddle 52 may have a smooth contacting surface as shown in FIG. 1 or have a knuckle piece 53 as shown in FIGS. 4 and 5 for engaging the bottom arm 38 when the lift is swinging up from the entry level position to the stow position. An occupant restraint belt 59 is provided with the wheelchair lift 10 for restraining a person in the wheelchair on the platform 22. All which are well known in the art, and the description thereof will not be described in detail, but will be described in general.

Figure 2:
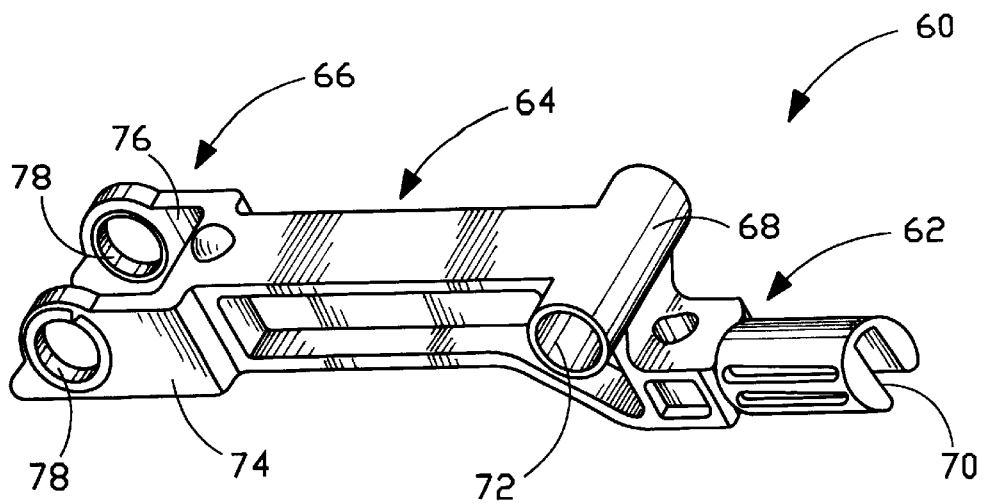
FIG. 2 is an enlarged top perspective view of the present invention unity arm lever adaptor.
Figure 3:
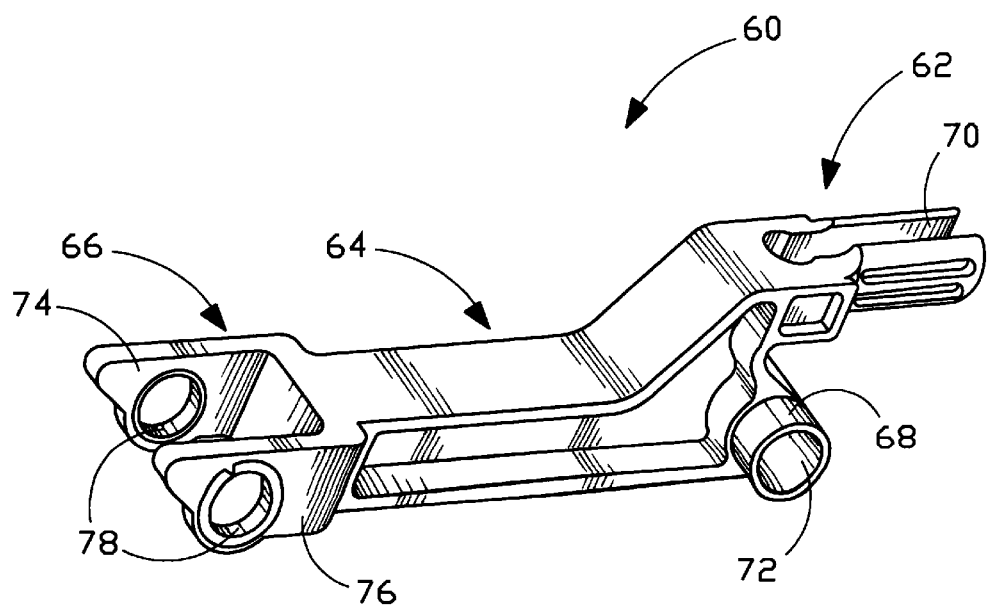
FIG. 3 is an enlarged bottom perspective view of the present invention unity arm lever adaptor.

Referring to FIGS. 2 and 3, there is shown the present invention unity arm lever adaptor 60. Each of the arm lever adaptors 60 are substantially identical, and to the extent they are, only one will be described in detail. The arm lever adaptor 60 comprises an extended step-down adaptor section 62, an elongated main section 64 and a pivotable yoke section 66. The extended step-down adaptor section 62 may have a longitudinal slot 70 which extends from one end to the beginning of the main section 64. The main section 64 has a pivotable end 68 with a transverse bore 72 therethrough, where the pivotable end 68 is remote from the yoke section 66 but adjacent to the step-down adaptor section 62. The pivotable end 68 is located just above the adaptor section 62. The yoke section 66 has two opposite sides 74 and 76. Each side has an opening 78 therethrough.

Referring to FIGS. 4 and 5, there is shown the arm lever adaptor 60 which is installed thereto. The extended step-down adaptor section 62 is inserted through an opening 80 provided on the vertical arm 44 to be adapted and secured to an adaptable distal end 82 of the handrail 48, where the pivotable end 68 of the main section 64 is pivotably connected to the vertical arm 44 by conventional means. The pivotable yoke section 66 is pivotably connected to the saddle 52 and the vertical link 54 by conventional means as shown.

The present invention arm lever adaptor conforms to conventional forms of manufacture or any other conventional way known to one skilled in the art.

Defined in detail, the present invention is a vehicular wheelchair lift for use in conjunction with a vehicle having a door opening and a floor, the wheelchair lift comprising: (a) a mounting assembly mounted on the vehicle floor adjacent to the vehicle door opening; (b) a linkage assembly mounted to the mounting assembly and including at least one top arm, at least one bottom arm parallel to the at least one top arm, at least one elongated vertical arm pivotably connected to the at least one top arm and the at least one bottom arm, at least one saddle or roller, and at least one vertical link; (c) a platform assembly pivotably connected to a free end of the at least one vertical arm of the linkage assembly; (d) an actuating system including at least one actuating member which is mounted between the at least one top arm and the at least one bottom arm of the linkage assembly for automatically unfolding and folding the platform assembly; (e) at least one handrail having an adaptable distal end and a holding proximal end; (f) at least one unity arm lever adaptor having an extended adaptor section, an elongated main section and a pivotable yoke section, the main section having a pivotable end remote from the yoke section and adjacent to the extended adaptor section; (g) the extended adaptor section of the at least one arm lever adaptor inserted through an opening on the at least one vertical arm of the linkage assembly for adapting and securing to the adaptable distal end of the at least one handrail, where the pivotable end of the main section is pivotably connected to the at least one vertical arm of the linkage assembly; and (h) the pivotable yoke section of the at least one arm lever adaptor pivotably connected to the at least one saddle or roller and the at least one vertical link of the linkage assembly.

Defined broadly, the present invention is an arm lever adaptor used in conjunction with a wheelchair lift including at least one actuating assembly, a platform assembly, a linkage assembly connected to the at least one actuating assembly and the platform assembly, and at least one handrail, the linkage assembly including at least one pair of spaced apart parallel arms, at least one elongated vertical arm pivotably connected to the at least one pair of parallel arms, at least one saddle or roller, and at least one vertical link, the arm lever adaptor comprising: (a) an elongated body having an extended adaptor section, a main section and a pivotable yoke section, the main section having a pivotable end remote from the yoke section and adjacent to the extended adaptor section; (b) the extended adaptor section for inserting through an opening on the at least one vertical arm of the linkage assembly for adapting and securing to the at least one handrail, where the pivotable end of the main section is for pivotably connecting to the at least one vertical arm of the linkage assembly; and (c) the pivotable yoke section for pivotably connecting to the at least one saddle or roller and the at least one vertical link of the linkage assembly.

Defined more broadly, the present invention is an arm lever adaptor used in conjunction with a lift including a platform assembly, a linkage assembly connected to the platform assembly, and at least one handrail, the linkage assembly including at least one vertical arm, at least one engaging member, and at least one vertical link, the arm lever adaptor comprising: (a) a body having an adaptor section, a main section and a pivotable section; (b) the adaptor section for adapting and securing to the at least one handrail; and (c) the pivotable section for pivotably connecting to the at least one engaging member and the at least one vertical link of the linkage assembly.

Of course the present invention is not intended to be restricted to any particular form or arrangement, or any specific embodiment disclosed herein, or any specific use, since the same may be modified in various particulars or relations without departing from the spirit or scope of the claimed invention hereinabove shown and described of which the apparatus shown is intended only for illustration and for disclosure of an operative embodiment and not to show all of the various forms or modifications in which the present invention might be embodied or operated.

The present invention has been described in considerable detail in order to comply with the patent laws by providing full public disclosure of at least one of its forms. However, such detailed description is not intended in any way to limit the broad features or principles of the present invention, or the scope of patent monopoly to be granted.

What is claimed is:

1. An arm lever adaptor used in conjunction with a lift including a platform assembly, a linkage assembly connected to the platform assembly, and at least one handrail, the linkage assembly including at least one vertical arm, at least one engaging member, and at least one vertical link, the arm lever adaptor comprising:
   a. a body having an adaptor section, a main section and a pivotable section;
   b. said adaptor section for adapting and securing to said at least one handrail;
   c. said pivotable section for pivotably connecting to said at least one engaging member and said at least one vertical link of said linkage assembly; and
   d. said main section having a pivotable end remote from said pivotable section and adjacent to said adaptor section, where the pivotable end is pivotably connected to said at least one vertical arm of said linkage assembly.

2. The arm lever adaptor in accordance with claim 1 wherein said at least one engaging member includes a saddle.

3. The arm lever adaptor in accordance with claim 1 wherein said body is a unity member.

4. An arm lever adaptor used in conjunction with a wheelchair lift including at least one actuating assembly, a platform assembly, a linkage assembly connected to the at least one actuating assembly and the platform assembly, and at least one handrail, the linkage assembly including at least one pair of spaced apart parallel arms, at least one elongated vertical arm pivotably connected to the at least one pair of parallel arms, at least one saddle, and at least one vertical link, the arm lever adaptor comprising:
   a. an elongated body having an extended adaptor section, a main section and a pivotable yoke section, the main section having a pivotable end remote from the yoke section and adjacent to the extended adaptor section;

b. said extended adaptor section for inserting through an opening on said at least one vertical arm of said linkage assembly for adapting and securing to said at least one handrail, where said pivotable end of said main section is for pivotably connecting to said at least one vertical arm of said linkage assembly; and c. said pivotable yoke section for pivotably connecting to said at least one saddle and said at least one vertical link of said linkage assembly.

5. The arm lever adaptor in accordance with claim 4 wherein said elongated body is a unity member.

6. A vehicular wheelchair lift for use in conjunction with a vehicle having a door opening and a floor, the wheelchair lift comprising:

a. a mounting assembly mounted on said vehicle floor adjacent to said vehicle door opening;

b. a linkage assembly mounted to said mounting assembly and including at least one top arm, at least one bottom arm parallel to the at least one top arm, at least one elongated vertical arm pivotably connected to the at least one top arm and the at least one bottom arm, at least one saddle, and at least one vertical link;

c. a platform assembly pivotably connected to a free end of said at least one vertical arm of said linkage assembly;

d. an actuating system including at least one actuating member which is mounted between said at least one top arm and said at least one bottom arm of said linkage assembly for automatically unfolding and folding said platform assembly;

e. at least one handrail having an adaptable distal end and a holding proximal end;

f. at least one unity arm lever adaptor having an extended adaptor section, an elongated main section and a pivotable yoke section, the main section having a pivotable end remote from the yoke section and adjacent to the extended adaptor section;

g. said extended adaptor section of said at least one arm lever adaptor inserted through an opening on said at least one vertical arm of said linkage assembly for adapting and securing to said adaptable distal end of said at least one handrail, where said pivotable end of said main section is pivotably connected to said at least one vertical arm of said linkage assembly; and h. said pivotable yoke section of said at least one arm lever adaptor pivotably connected to said at least one saddle and said at least one vertical link of said linkage assembly.

7. The vehicular wheelchair lift in accordance with claim 6 wherein said actuating system includes a hydraulic system.

8. The vehicular wheelchair lift in accordance with claim 6 wherein said actuating system includes an electric system.

9. The vehicular wheelchair lift in accordance with claim 6 further comprising a knuckle piece for engaging said at least one bottom arm of said linkage assembly.

* * * * *